Feb. 23, 1954
R. G. HOLT
2,670,171
VALVE
Filed April 30, 1947
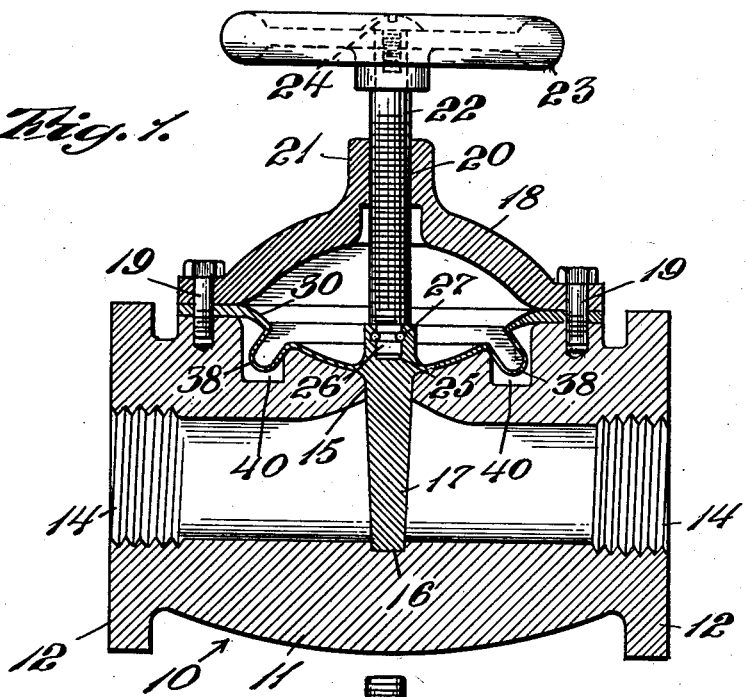
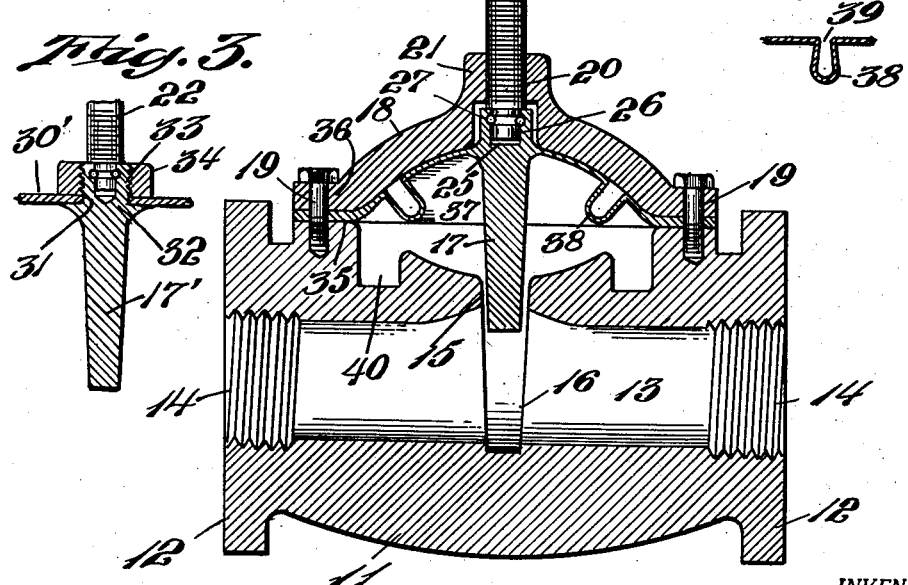
INVENTOR.
Robert G. Holt
BY
Barlow & Barlow
ATTORNEYS.

Patented Feb. 23, 1954

2,670,171

UNITED STATES PATENT OFFICE 2,670,171

VALVE

Robert G. Holt, Johnston, R. I., assignor to MCA Sales Corporation, a corporation of Rhode Island Application April 30, 1947, Serial No. 744,931

4 Claims. (Cl. 251—31)

This invention relates to a valve of the type which may be of general use and may be constructed for use in the controlling of the flow of acids or other liquids from which corrosion of metal valves usually occurs.

One of the objects of this invention is to provide a valve in which a stuffing box for the actuating means may be eliminated.

Another object of this invention is to provide a valve which will maintain the liquid which is controlled sealed from contact with the actuating means for the valve so that the actuating means may be of usually known materials, such as metals, whereas other parts of the valve may be formed of acid resisting resinous-like materials.

Another object of this invention is to provide a known type of gate closure member for the valve while utilizing flexible means for sealing this closure member and maintaining the actuating means for the valve distinct therefrom.

With these and other objects in view, the invention consists of certain novel features of construction as will be more fully described and particularly pointed out in the appended claims.

In the accompanying drawings:

Fig. 1 is a sectional view of the valve with the closing member blocking the passage for the liquid through the body of the valve;

Fig. 2 is a view similar to Fig. 1 but illustrating the closing member in open position;

Fig. 3 is a sectional view of a fragmental portion of the closure member and diaphragm connected thereto in a modified form;

Fig. 4 is a fragmental sectional view illustrating a portion of the diaphragm in a position intermediate its open or closed location to show the flexing actuation thereof.

In proceeding with this invention, I provide a body having a through passage and a closure member to block this passage all of a material which may be resistant to acids or other corrosive liquids. The means for actuating the closure member to and from closed position is mounted on the body and is usually of some metal which may readily be utilized for this actuation, and I provide a seal secured to the body and to the closure member to prevent the liquids which may be conducted through the passage in the valve from reaching this actuating means so that a seal for the liquid is provided, and it is unnecessary to utilize a compressive packing or corrosive resisting materials at this location.

With reference to the drawings, 10 designates a body member which, as shown, is generally barrel shape at 11 with flanges 12 at its opposite ends. A passage 13 is provided through the body which passage is threaded at its opposite ends as at 14 for the connection of suitable conduits to the body. An opening 15 is provided through a portion of the body and a recess 16 is provided in the conduit 13 for the reception of a closure member 17 which is generally wedge shape and which will tightly fit in the recess 16 and pass through the opening 15 in moving from the open position, such as shown in Fig. 2, to the closed position, shown in Fig. 1, so that the passage 13 is blocked against conducting liquid therethrough.

In order to actuate the closure member 17, I provide an arched support 18 which is secured to the body 11 by bolts 19. At the upper portion of this arched support, there is a threaded opening 20 extending through a boss 21, and it receives a threaded shaft 22 which has a hand wheel 23 at its upper outer end removably secured in position by screw 24. The lower end of this shaft 22 is received in an opening 25 in the upper end of the closure member 17 by reason of its being reduced as at 26 and is held in this position by a spring ring 27 which swivelly connects the end of this shaft 22 in this relationship. Thus, when the shaft is rotated in one direction by the handwheel, the closure member 17 is moved to closed position, as shown in Fig. 1; while, when the shaft is oppositely rotated, the closure member is moved to open position, such as shown in Fig. 2.

In order to avoid the necessity of using a stuffing box or packaging about the shaft 22 so that the same may be freely moved, I provide a diaphragm 30 which is connected to the closure member 17 either by being formed as one piece with this closure member, as shown in Figs. 1 and 2, or by means of an opening 31 therein for receiving a reduced stem 32 of the closure member 17' which stem is threaded as at 33 and a nut 34 is provided for fastening the diaphragm 30' thereto. The outer edge of the diaphragm 35 is secured to the body 11 by the arched support 18 which has a peripheral ring portion 36 engaging the edge of the diaphragm so that it will be bound firmly in position and form an effective seal to prevent the leaking of any fluid which may escape from the passage 13 through the opening 15 and into the chamber 37 beneath the diaphragm.

The diaphragm may be provided in somewhat wavy form, as shown at 38, so that as it flexes from the open to the closed position of the closure member, this portion 38 may close, as shown in Fig. 4, at 39 so that a large part of the flexing of the diaphragm will occur at this location. Recesses 40 are provided in the body for the reception of the wavy portion in the closed position of the valve. This wavy portion, of course, will be annular, extending generally circularly about the closure member.

From the construction of the valve, it will be seen that the only parts which touch the fluid which is being conducted are the body, the closure member and the diaphragm, the support 18 and the actuating means being entirely free from contact with the fluid conducted.

By this construction, it makes possible the making of these fluid contacted parts of material which will resist corrosion from this fluid; and, in the case of acids, I may mold the body and diaphragm and closure member of some of the acid-resisting resinous materials, such as vinylidine chloride, a polymeric amide or a methyl methalicate, the particular material being chosen with reference to the fluid to be controlled.

As above noted, the diaphragm and closure member may be formed of one piece of this resinous material or the diaphragm may be formed separate and mechanically attached in a sealing relation with the closure member, such as shown in Fig. 3. The diaphragm will be molded thinner at its flexing portion than at the portion which is bound in position by the clamp 36.

The supporting structure for the actuating member 18 by not coming in contact with the fluid may be formed of metal or any suitable material that the proper strength for the strains to which it is subjected may be supported. Although I have illustrated a threaded shaft and threads for the mounting of this shaft, it will be apparent that I may use some other means for moving this shaft to in turn move the closure member.

I claim:

1. In a valve, a body having a passage therethrough, a closure member movably mounted relative to said body to extend across said passage and block the same, a chamber secured to said body into which said closure member extends in opening said passage, said passage and chamber having substantially the same dimension in the direction of movement of said closure member, a diaphragm secured to said closure member and extending across said chamber laterally of said direction of movement and having a wavy portion to extend the flexibility of the diaphragm, said chamber having upper and lower arcuate portions to receive said diaphragm in the extremes of its position and means to move said closure member and diaphragm.

2. In a valve as in claim 1 wherein the closure member and diaphragm are of the same piece of material.

3. In a valve as in claim 1 wherein the closure member and diaphragm are of the same piece of material which is an acid resisting resin.

4. In a valve as in claim 1 wherein one of said arcuate portions has a recess to receive said wavy portion.

ROBERT G. HOLT.

References Cited in the file of this patent
UNITED STATES PATENTS

| Number | Name | Date |
| --- | --- | --- |
| 650,179 | Knox | May 27, 1900 |
| 674,885 | Stratton | May 28, 1901 |
| 1,276,715 | Briedenbach | Aug. 27, 1918 |
| 1,631,372 | Harris | June 7, 1927 |
| 2,016,997 | Hartke | Oct. 8, 1935 |
| 2,048,858 | Gibbs | July 28, 1936 |
| 2,196,227 | Paget | Apr. 9, 1940 |
| 2,360,603 | Ward | Oct. 17, 1944 |